(12) United States Patent
Lo Faro et al.

(10) Patent No.: US 11,138,601 B2
(45) Date of Patent: Oct. 5, 2021

(54) METHOD AND SYSTEM FOR PREDICTING FUTURE CARDHOLDER BEHAVIOR

(71) Applicant: MASTERCARD INTERNATIONAL INCORPORATED, Purchase, NY (US)

(72) Inventors: Walter F. Lo Faro, Chesterfield, MO (US); Christopher J. Merz, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 58 days.

(21) Appl. No.: 16/396,268

(22) Filed: Apr. 26, 2019

(65) Prior Publication Data
US 2019/0251559 A1 Aug. 15, 2019

Related U.S. Application Data

(63) Continuation of application No. 12/783,195, filed on May 19, 2010, now abandoned.
(Continued)

(51) Int. Cl.
*G06Q 30/02* (2012.01)
*G06Q 20/38* (2012.01)
(Continued)

(52) U.S. Cl.
CPC ......... *G06Q 20/389* (2013.01); *G06Q 20/357* (2013.01); *G06Q 20/405* (2013.01);
(Continued)

(58) Field of Classification Search
CPC .................................................... G06Q 30/02
See application file for complete search history.

(56) References Cited

U.S. PATENT DOCUMENTS 6,430,539 B1  8/2002 Lazarus et al.
7,546,254 B2  6/2009 Bednarek
(Continued)

FOREIGN PATENT DOCUMENTS

WO  0203226 A1  1/2002

OTHER PUBLICATIONS

PT/US2010/035556; International Search Report and the Written Opinion of the International Searching Authority dated Jul. 20, 2010; 11 pages.
(Continued)

*Primary Examiner* — Vincent M Cao
(74) *Attorney, Agent, or Firm* — Armstrong Teasdale LLP

(57) ABSTRACT

A computer-based method for managing a profile for a cardholder is provided. The cardholder having an account associated with a payment card. The method includes electronically receiving, at the computer, transaction information for a cardholder for transactions with at least a first business entity and a second business entity, the transaction information including data representing each transaction initiated by the cardholder using the payment card and at least one subdivision within the first business entity, the transaction information further including data representing each transaction initiated by the cardholder using the payment card and the second business entity. The method also includes electronically storing the transaction information within the database, generating a profile of the stored transaction information for the cardholder, the profile including a type, a recency and a frequency of transactions initiated by the cardholder using the payment card and the at least one subdivision, grouping the cardholder into a single cluster with other cardholders registered within the payment card network based on the profile of the cardholder and the
(Continued)

other cardholders, and outputting marketing information based on the cluster.

20 Claims, 6 Drawing Sheets

Related U.S. Application Data

(60) Provisional application No. 61/181,222, filed on May 26, 2009.

(51) Int. Cl.
  *G06Q 20/34* (2012.01)
  *G06Q 20/40* (2012.01)
  *G07F 7/10* (2006.01)

(52) U.S. Cl.
  CPC ..... *G06Q 30/0203* (2013.01); *G06Q 30/0226* (2013.01); *G07F 7/1008* (2013.01); *G06Q 30/0201* (2013.01)

(56) References Cited

U.S. PATENT DOCUMENTS

| | | | |
|---|---|---|---|
| 7,606,750 B1 | 10/2009 | Hoag et al. | |
| 2001/0014868 A1* | 8/2001 | Herz | G06Q 30/02 705/14.38 |
| 2001/0044751 A1* | 11/2001 | Pugliese, III | G06Q 30/0643 705/14.1 |
| 2001/0049623 A1 | 12/2001 | Aggarwal et al. | |
| 2002/0117544 A1 | 8/2002 | Wolf et al. | |
| 2003/0009393 A1 | 1/2003 | Norris | |
| 2003/0033211 A1 | 2/2003 | Haines et al. | |
| 2003/0088562 A1 | 5/2003 | Dillon et al. | |
| 2003/0187708 A1 | 10/2003 | Baydar et al. | |
| 2004/0139064 A1 | 7/2004 | Chevallier et al. | |
| 2005/0038701 A1 | 2/2005 | Matthew | |
| 2006/0136306 A1 | 6/2006 | Rothman et al. | |
| 2006/0136589 A1 | 6/2006 | Konig et al. | |
| 2007/0011039 A1* | 1/2007 | Oddo | G06F 21/316 705/7.33 |
| 2007/0038568 A1 | 2/2007 | Greene et al. | |
| 2007/0038659 A1* | 2/2007 | Datar | G06Q 30/02 |
| 2008/0077499 A1 | 3/2008 | Ariff et al. | |
| 2008/0091540 A1 | 4/2008 | Blagg et al. | |
| 2008/0195427 A1 | 8/2008 | Hart | |
| 2008/0262925 A1 | 10/2008 | Kim et al. | |
| 2009/0037264 A1 | 2/2009 | Del Favero et al. | |
| 2009/0132366 A1 | 5/2009 | Lam et al. | |
| 2009/0234683 A1 | 9/2009 | Anderson et al. | |
| 2009/0307060 A1 | 12/2009 | Merz et al. | |
| 2010/0301114 A1 | 12/2010 | Lo Faro et al. | |
| 2011/0106607 A1 | 5/2011 | Alfonso et al. | |

OTHER PUBLICATIONS

An Extended European Search Report, dated Jan. 3, 2014, for copending European patent application No. EP10781024.

\* cited by examiner

METHOD AND SYSTEM FOR PREDICTING FUTURE CARDHOLDER BEHAVIOR

CROSS REFERENCE TO RELATED APPLICATIONS

This application is a continuation application of U.S. patent application Ser. No. 12/783,195, filed May 19, 2010, entitled "METHOD AND SYSTEM FOR TRANSACTION BASED PROFILING OF CUSTOMERS WITHIN A MERCHANT NETWORK", which claims the benefit of U.S. Provisional Patent Application No. 61/181,222 filed May 26, 2009, the disclosures of each of which are hereby incorporated by reference in their entirety.

BACKGROUND OF THE INVENTION

This invention relates generally to populating customer profiles, and more particularly, to a computer-based system and method for transaction based profiling of customers within a merchant network.

Historically, the use of "charge" or transaction cards or payment cards for consumer transaction payments was at most regional and based on relationships between local credit or debit card issuing banks and various local merchants. The transaction card industry has since evolved with the issuing banks forming associations or networks (e.g., MasterCard®) and involving third party transaction processing companies (e.g., "Merchant Acquirers") to enable cardholders to widely use transaction cards at any merchant's establishment, regardless of the merchant's banking relationship with the card issuer. (MasterCard is a registered trademark of MasterCard International Incorporated located in Purchase, N.Y.).

For example, FIG. 1 of the present application shows an exemplary multi-party payment card industry system for enabling payment-by-card transactions in which the merchants and issuer do not need to have a one-to-one special relationship. Yet, various scenarios exist in the payment-by-card industry today, where the card issuer has a special or customized relationship with a specific merchant, or group of merchants (a merchant network). These special or customized relationships may, for example, include private label programs, co-brand programs, proprietary card brands, rewards programs, and others. Rewards programs typically involve the award of rewards points to a consumer based upon certain incentivized actions taken by the consumer, such as the purchase of a certain value of goods or services from a particular merchant. Rewards points may be referred to by a particular rewards program as "rewards dollars," "rewards miles," or other descriptive name. The consumer then has the option of redeeming his or her accumulated rewards points according to rewards program rules to obtain better terms for a later transaction. The costs of providing such rewards program incentives to the cardholder may be borne solely by the issuer, jointly by the issuer and a merchant or third party, or solely by a merchant or third party, depending upon the type and sponsorship of the rewards program.

In addition, at least some known issuers of payment cards, such as credit cards, have also attempted to create payment card programs that are directed to a particular segment of society. These credit card programs may include certain features such as rewards points or purchasing incentives (i.e., discounts on certain purchases) that are believed to be attractive to a certain segment of society.

These types of programs that are associated with payment cards are typically used by a card issuer, merchants, or third parties to entice cardholders to use a particular payment card. The goal of these types of programs is to build loyalty with a cardholder. Cardholder loyalty may be described to include a cardholder who frequently uses a specific payment card for a variety of purchases over a period of time.

The parties that provide these programs, such as card issuers, desire a system that monitors the usage of their cards to determine the loyalty of a cardholder. These parties may also be interested in predicting when a cardholder will stop using a particular payment card such that an incentive (rewards programs or a gift) can be offered to the cardholder in an effort to keep the cardholder as a loyal customer. To that end, the parties may attempt to profile their customers, to try to get more accurate predictions. It is a continuing challenge to profile customers in order to predict their future behavior at any one of a purchase, merchant or merchant network level so that card networks, card issuers, and merchants accepting the cards for payments can provide the services that will result in retention of existing customers and will attract new card users.

BRIEF DESCRIPTION OF THE INVENTION

In one aspect, a computer-based method for managing a loyalty profile for a cardholder is provided. The cardholder having an account associated with a payment card wherein the payment card is issued by an issuer to the cardholder. The method performed using a computer coupled to a database and includes electronically receiving transaction information of the cardholder for transactions with a first business entity and a second business entity at the computer, the transaction information including data representing each transaction between the cardholder and a subdivision within the first business entity initiated by the cardholder and associated with the cardholder account and the transaction information including data representing each transaction between the cardholder and the second business entity initiated by the cardholder and associated with the cardholder account. The method also includes electronically storing the transaction information within the database, grouping a plurality of the cardholders into a cluster based on common transactions and similar transactions initiated by each of the plurality of cardholders, and outputting marketing information based on the clusters.

In another aspect, a network-based system for determining a loyalty profile for a cardholder account is provided. The loyalty profile is associated with a subdivision of a business entity and the cardholder account is associated with a payment card used to initiate financial transactions over a third-party interchange network. The payment card is issued by an issuer to the cardholder. The system includes a client computer system, a database, and a server system configured to be coupled to the client computer system and the database wherein the server system is associated with the interchange network and is configured to receive transaction information of the cardholder, the transaction information including data representing each transaction in the subdivision of the business entity initiated by the cardholder and associated with the cardholder account. The server system is further configured to store the transaction information within the database, and generate the profile for the cardholder account, the profile representing a pattern of usage of the cardholder in each subdivision of the business entity by the cardholder.

In yet another aspect, a computer program embodied on a computer readable medium for determining a loyalty profile based on a SKU (stock-keeping unit) of items purchased for a cardholder is provided. The cardholder having an account associated with a payment card wherein the payment card is issued by an issuer to the cardholder. The program includes at least one code segment executable by a computer to instruct the computer to receive transaction information of the cardholder, the transaction information including data representing a SKU of items purchased in each transaction initiated by the cardholder and associated with the cardholder account. The program also includes at least one code segment executable by a computer to instruct the computer to record the transaction information, and generate the profile for the cardholder, the profile representing a pattern of usage of the payment card and the associated account by the cardholder for items based on the SKU of each of the items in each transaction at a first business entity.

DETAILED DESCRIPTION OF THE INVENTION

Figure 1:
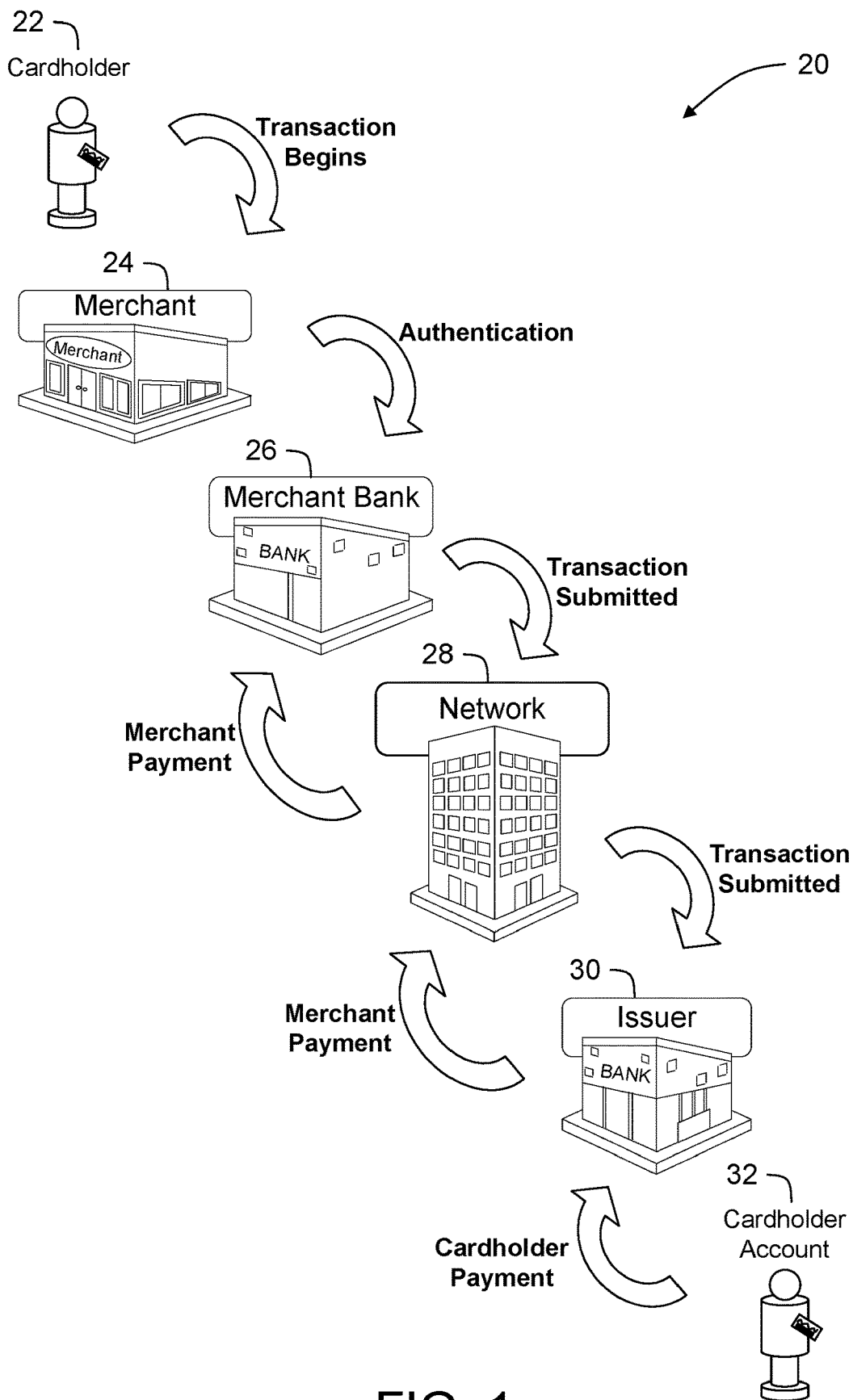
FIG. 1 is a schematic diagram illustrating an exemplary multi-party payment card industry system in accordance with an exemplary embodiment of the present invention for enabling ordinary payment-by-card transactions in which the merchants and issuer do not need to have a one-to-one special relationship.

The methods and systems described herein relate to a financial transaction card payment system, such as a credit card payment system using the MasterCard® interchange (MasterCard is a registered trademark of MasterCard International Incorporated located in Purchase, N.Y.). The MasterCard® interchange is a proprietary communications standard promulgated by MasterCard International Incorporated® for the exchange of financial transaction data between financial institutions that have registered with MasterCard International Incorporated®.

Described herein are exemplary embodiments of systems and processes for providing a transaction-based approach to determine and populate a loyalty profile of a cardholder. In a specific embodiment, SKU-level (stock-keeping unit) data and other levels of hierarchy imposed by a merchant, for example, class and department, are utilized in the transaction based profiling of customers within a merchant network. An example hierarchy for a merchant's products, in ascending order, may include SKU, sub-class, class, department, and group. More specifically, the SKU-based loyalty performance engine is a system for recording and analyzing the behavior of customers within a network of merchants. The data processed by a SKU LPE (loyalty profile engine) is provided by the participating merchant and it includes point-of-sale transaction receipts as well as product hierarchy definitions. Such a system makes very targeted marketing possible based on for example, but not limited to, changes in a customer's trip frequency, and spend breadth.

The results of the data processing are then utilized to populate loyalty profiles. For example, SKU-level transaction based profiling of customers, and an associated profile engine, is generally intended for use in a partnership with merchants although it can be used with multiple merchants simultaneously. Class and department data associated with the transaction is similarly utilized. In one embodiment, the SKU data is primarily utilized as a key with which to merge on other levels of hierarchy, such as class and department. More specifically, the exemplary systems and methods used for providing a concise, scalable, and contemporary view of the customer's behavior within a particular merchant. These profiles can then be used in a near real-time environment for implementing campaigns that increase a customer's spend, frequency of visit, and the breadth of spend within the store or with a merchant. While described in the following paragraphs as SKU-level transaction based profiling, it should be understood that the embodiments may utilize class and department data from transactions, as well as other types of data in generating profiles of the customers.

A first profile engine instance has been previously described which monitors rewards payment card transaction (including retail, call center, and redemption). The embodiments described herein relate to a second profile engine instance which monitors, for example, in-store SKU-level transactions and generates profile variables at the SKU, department, and class level. The two profile engine instances may be utilized in conjunction with one another though it should also be understood that they are independent peer systems.

For example, SKU-level transaction based profiling is one portion of a system for monitoring purchasing behavior, which includes transactions, purchasing frequency, types of purchases, redemptions, contacts with call centers, survey responses, and web site activity, all of which can be utilized in determining a loyalty profile for the cardholder based on the cardholder's purchasing behavior. As the cardholder's use of the issuer's card changes over time, the exemplary systems and methods provide the card issuer with a continuously updated profile for the cardholder and provide the card issuer with an indication of whether the cardholder is moving away from using the card issuer's payment card, changing spending activities, and changing the types of merchants a cardholder frequents.

The card issuer may use SKU-level transaction based profiling to provide an incentive to the cardholder to increase the cardholder's use of the issuer's card with one or more merchants, for example, the card issuer may issue a gift card or gift certificates related to the types of merchants the cardholder frequents or providing a "reward" for using the issuer's card in order to increase the cardholder's usage of the card.

The systems and processes described herein include a cardholder that utilizes a payment card to make a purchase from a merchant, wherein the merchant has registered with a bankcard network such that the purchase made by the cardholder using the payment card can be processed over the bankcard network. The payment card has associated therewith a financial account in a financial institution and one or more rewards features. The financial transaction payment system that processes the transaction includes a processing unit, an application program for execution on the processing unit, and a database for storing information relating to the cardholders, retail transactions, redemption of bonus points and/or incentives, call center activity by the holder, survey responses, web site navigation, and previously determined profiles.

A technical effect of the systems and processes described herein include at least one of (a) registering a cardholder with a multi-party payment card interchange; (b) providing a financial transaction payment system at the multi-party payment card interchange that includes a processing unit, an application program for execution on the processing unit, and a database for storing information relating to cardholders; (c) receiving at least one of SKU-level, class and department information for transactions by a cardholder; (d) updating profile information for the cardholder based on the transactions; (e) processing the cardholder information using a Loyalty Profile Engine; (f) generating a loyalty profile based on the processed cardholder information; (g) utilizing the updated profiles to implement campaigns attempting to increase at least one of the customer's spend, frequency of visit, and breadth of spend at a merchant; and (h) outputting reports on a periodic basis of the change in activity by a cardholder that includes spend breadth, spend ratio, and attrition to at least one of a card issuer, a merchant, and the multi-party payment card interchange for maintaining a relationship with the cardholder.

In one embodiment, a computer program is provided, and the program is embodied on a computer readable medium and utilizes an SAS with a user interface front-end for administration and a report generator. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

FIG. 1 is a schematic diagram 20 illustrating an exemplary multi-party payment card industry system in accordance with an exemplary embodiment of the present invention for enabling ordinary payment-by-card transactions in which the merchants and issuer do not need to have a one-to-one special relationship. The present invention relates to a payment card system, such as a credit card payment system using the MasterCard® interchange network. The MasterCard® interchange network is a set of proprietary communications standards promulgated by MasterCard International Incorporated® for the exchange of financial transaction data and settlement of funds between financial institutions that are members of MasterCard International Incorporated®. (MasterCard is a registered trademark of MasterCard International Incorporated located in Purchase, N.Y.).

In a typical payment card system, a financial institution called the "issuer" issues a payment card, such as a credit card, to a consumer, who uses the payment card to tender payment for a purchase from a merchant. To accept payment with the credit card, the merchant must normally establish an account with a financial institution that is part of the financial payment system. This financial institution is usually called the "merchant bank" or the "acquiring bank" or "acquirer bank." When a consumer 22 tenders payment for a purchase with a credit card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe, chip, or embossed characters on the credit card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor" or a "third party processor."

Using the interchange network 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge for a credit card transaction is not posted immediately to a consumer's account because bankcard associations, such as MasterCard International Incorporated®, have promulgated rules that do not allow a merchant to charge, or "capture," a transaction until goods are shipped or services are delivered. However, with respect to at least some debit card transactions, a charge may be posted at the time of the transaction. When a merchant ships or delivers the goods or services, the merchant captures the transaction by, for example, appropriate data entry procedures on the point-of-sale terminal. This may include bundling of approved transactions daily for standard retail purchases. If a consumer cancels a transaction before it is captured, a "void" is generated. If a consumer returns goods after the transaction has been captured, a "credit" is generated. The issuer bank 30 stores the credit card transaction information, such as the type of merchant, amount of purchase, date of purchase, in a data warehouse.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group. More specifically, a transaction is typically settled between the issuer and the interchange network, and then between the interchange network and the merchant bank (also known as the acquirer bank), and then between the merchant bank and the merchant.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 2:
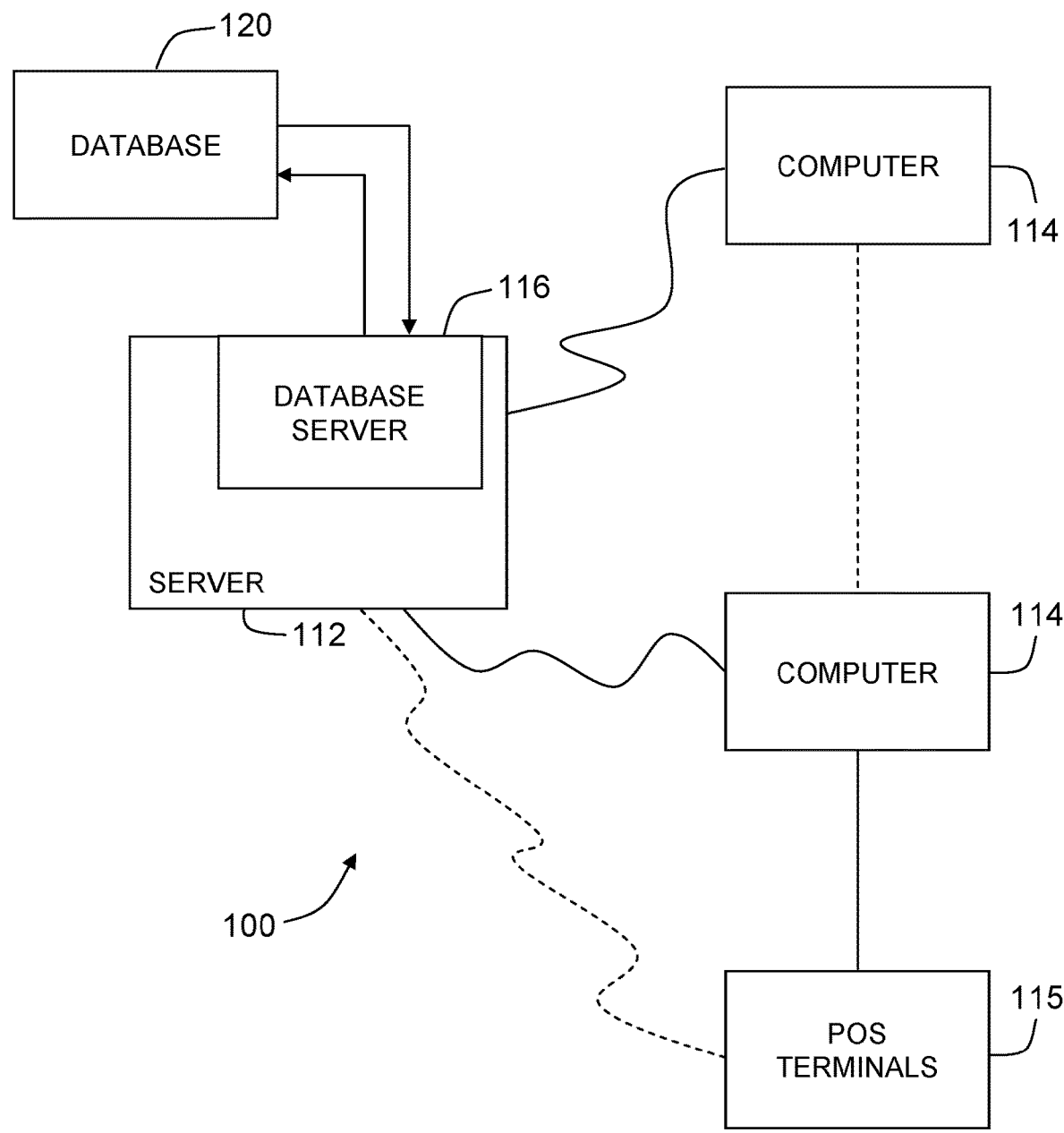
FIG. 2 is a simplified block diagram of an exemplary payment card system in accordance with one embodiment of the present invention.

FIG. 2 is a simplified block diagram of an exemplary payment card system 100, in accordance with one embodiment of the present invention. In one embodiment, system 100 is a financial transaction payment system, used for storing transaction data of users, within a payment card program used by the cardholder. In another embodiment, system 100 is a payment card system configured to process a transaction initiated by a cardholder using a payment card, determine whether the cardholder engaging in the transaction is registered within the system, store the data related to the transaction, and update the loyalty profile of the cardholder.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment.

System 100 also includes point-of-sale (POS) terminals 115, which are connected to client systems 114 and may be connected to server system 112. POS terminals 115 are interconnected to the Internet through many interfaces including a network, such as a local area network (LAN) or a wide area network (WAN), dial-in-connections, cable modems and special high-speed ISDN lines. POS terminals 115 could be any device capable of interconnecting to the Internet and includes an input device capable of reading information from a consumer's financial transaction card.

A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

As discussed herein, database 120 stores information relating to cardholders, rewards features associated with each cardholder's payment card, and rewards data. Database 120 may also store transaction data generated as part of sales activities conducted over the bankcard network including data relating to merchants, account holders or customers, and purchases. Database 120 may also include redemption of bonus points and/or incentives, call center activity by the holder, survey responses, web site navigation, and previously determined profiles.

In the example embodiment, one of client systems 114 may be associated with an acquirer while another one of client systems 114 may be associated with an issuer, POS terminal 115 may be associated with a participating merchant, and server system 112 may be associated with the interchange network.

Figure 3:
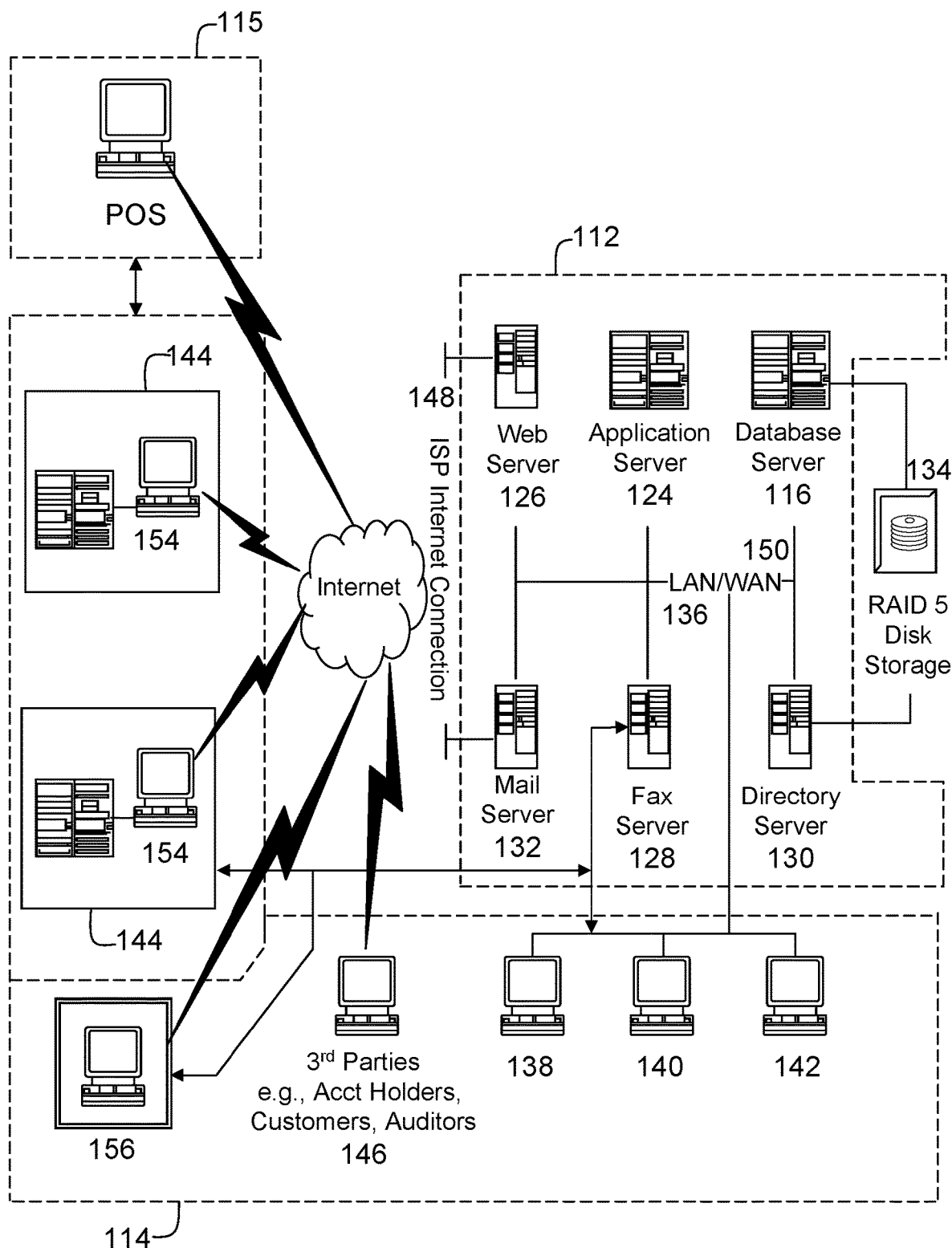
FIG. 3 is an expanded block diagram of an exemplary embodiment of a server architecture of a system in accordance with one embodiment of the present invention.

FIG. 3 is an expanded block diagram of an exemplary embodiment of a server architecture of a system 122, in accordance with one embodiment of the present invention. Components in system 122, identical to components of system 100 (shown in FIG. 2), are identified in FIG. 3 using the same reference numerals as used in FIG. 2. System 122 includes server system 112 and client systems 114, and POS terminals 115. Server system 112 further includes database server 116, an application server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems, such as, but not limited to, workstations 138, 140, and 142 as well.

Figure 4:
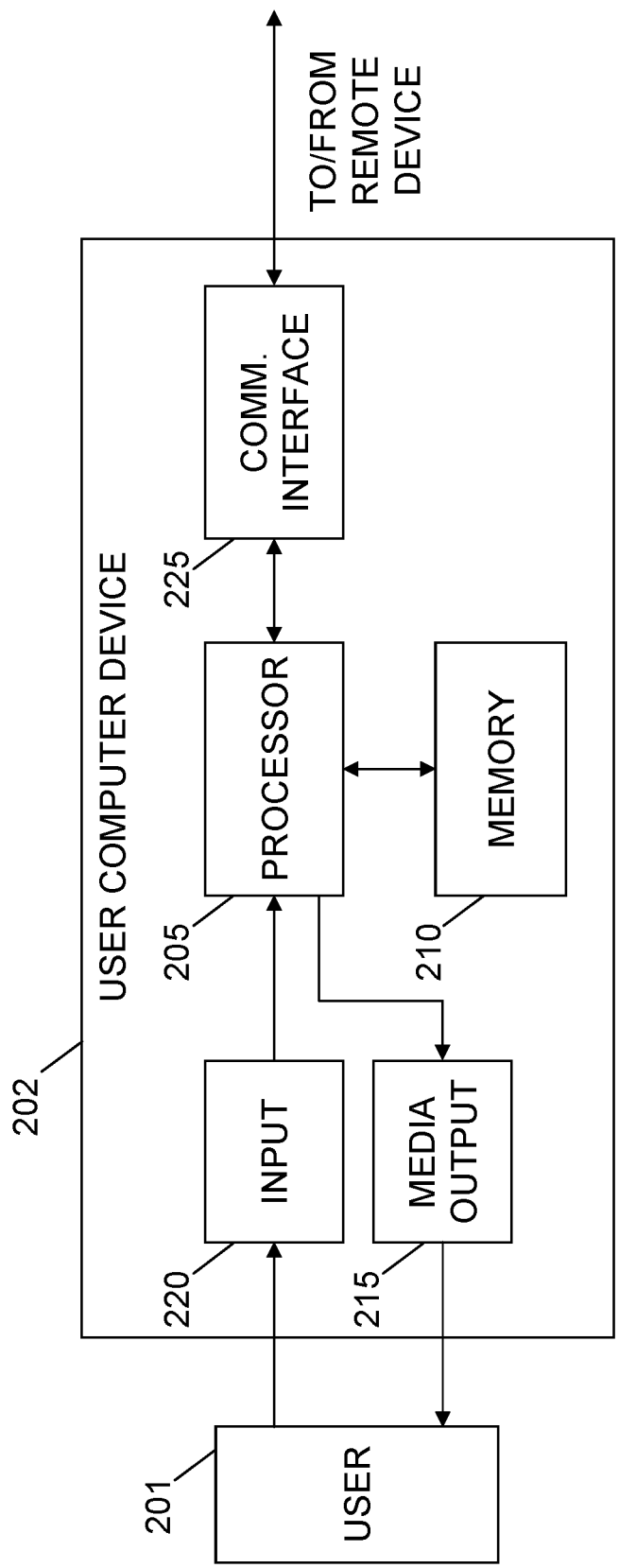
FIG. 4 illustrates an exemplary configuration of a user computer device for use with a client system shown in FIGS. 2 and 3.

FIG. 4 illustrates an exemplary configuration of a user computer device 202 operated by a user 201. User computer device 202 may include or be included in, but is not limited to, client systems 114, 138, 140, and 142, POS terminal 115, workstation 154, and manager workstation 156. Exemplary user computer devices 202 include personal computers (e.g., workstations and/or portable computers), kiosks, mobile telephones, electronic book readers, and/or digital media players.

User computer device 202 includes a processor 205 for executing instructions. In some embodiments, executable instructions are stored in a memory device 210. Processor 205 may include one or more processing units (e.g., in a multi-core configuration). Memory device 210 is any device allowing information such as executable instructions and/or transaction data to be stored and retrieved. Memory device 210 may include one or more computer readable media.

User computer device 202 also includes at least one media output component 215 for presenting information to user 201. Media output component 215 is any component capable of conveying information to user 201. In some embodiments, media output component 215 includes an output adapter (not shown) such as a video adapter and/or an audio adapter. An output adapter is operatively coupled to a processor 205 and operatively couplable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 215 is configured to present a graphical user interface (e.g., a web browser and/or a client application) to user 201. A graphical user interface may include, for example, an online store interface for viewing and/or purchasing items, and/or a wallet application for managing payment information.

In some embodiments, user computer device 202 includes an input device 220 for receiving input from user 201. User 201 may use input device 220 to select and/or enter, without limitation, one or more items to purchase, a purchase request, access credential information, and/or payment information. Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

User computer device 202 may also include a communication interface 225, which is communicatively couplable to a remote device such as server system 112. Communication interface 225 may include, for example, a wired or wireless network adapter and/or a wireless data transceiver for use with a mobile telecommunications network.

Stored in memory device 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website from server system 112. A client application allows user 201 to interact with a server application of a merchant computer system, POS terminal 115, and/or server system 112.

Figure 5:
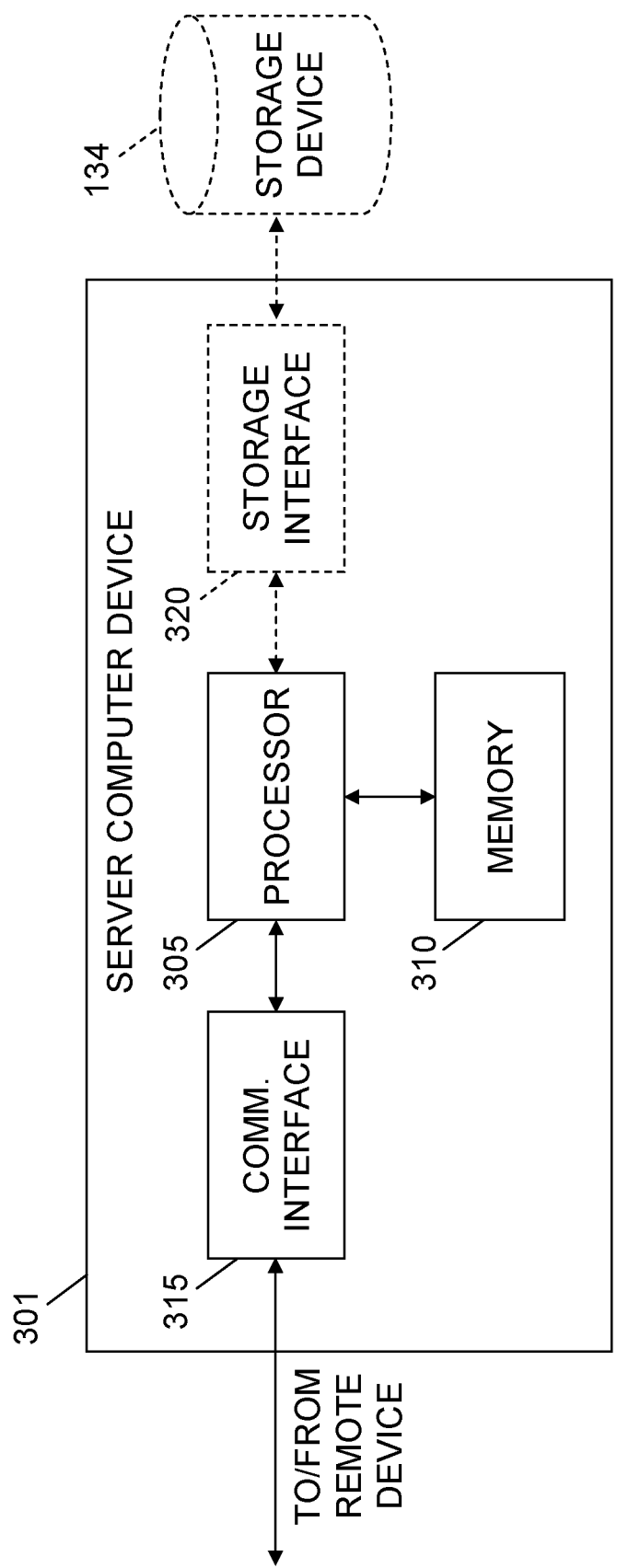
FIG. 5 illustrates an exemplary configuration of a server computer device for use with a server system shown in FIGS. 2 and 3.

FIG. 5 illustrates an exemplary configuration of a server computer device 301, which may be included in server system 112 (shown in FIG. 2). Server computer device 301 may include, but is not limited to, a merchant computer system, POS terminal 115, database server 116, application server 124, web server 126, fax server 128, directory server 130, and/or mail server 132.

Server computer device 301 also includes a processor 305 for executing instructions. Instructions may be stored in a memory device 310, for example. Processor 305 may include one or more processing units (e.g., in a multi-core configuration). Memory device 310 may also include cardholder information (e.g., contact information), account information, authentication program enrollment information, access credential information, transaction information, and/or any other information relevant for processing and/or authentication of a financial transaction.

Processor 305 is operatively coupled to a communication interface 315 such that server computer device 301 is capable of communicating with a remote device such as user computer device 202 or another server computer device 301. For example, communication interface 315 may receive requests from client system 114 via the Internet, as illustrated in FIG. 3.

Processor 305 may also be operatively coupled to a storage device 134. Storage device 134 is any computer-operated hardware suitable for storing and/or retrieving data, such as, but not limited to, data associated with database 120. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks and/or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Computer devices such as user computer device 202 and server computer device 301 may be grouped together in a computer system. For example, a computer system may be created by connecting a plurality of server computer devices 301 and/or user computer devices 202 to a single network. Alternatively, one or more computer devices operable by a single user may be considered a computer system.

Figure 6:
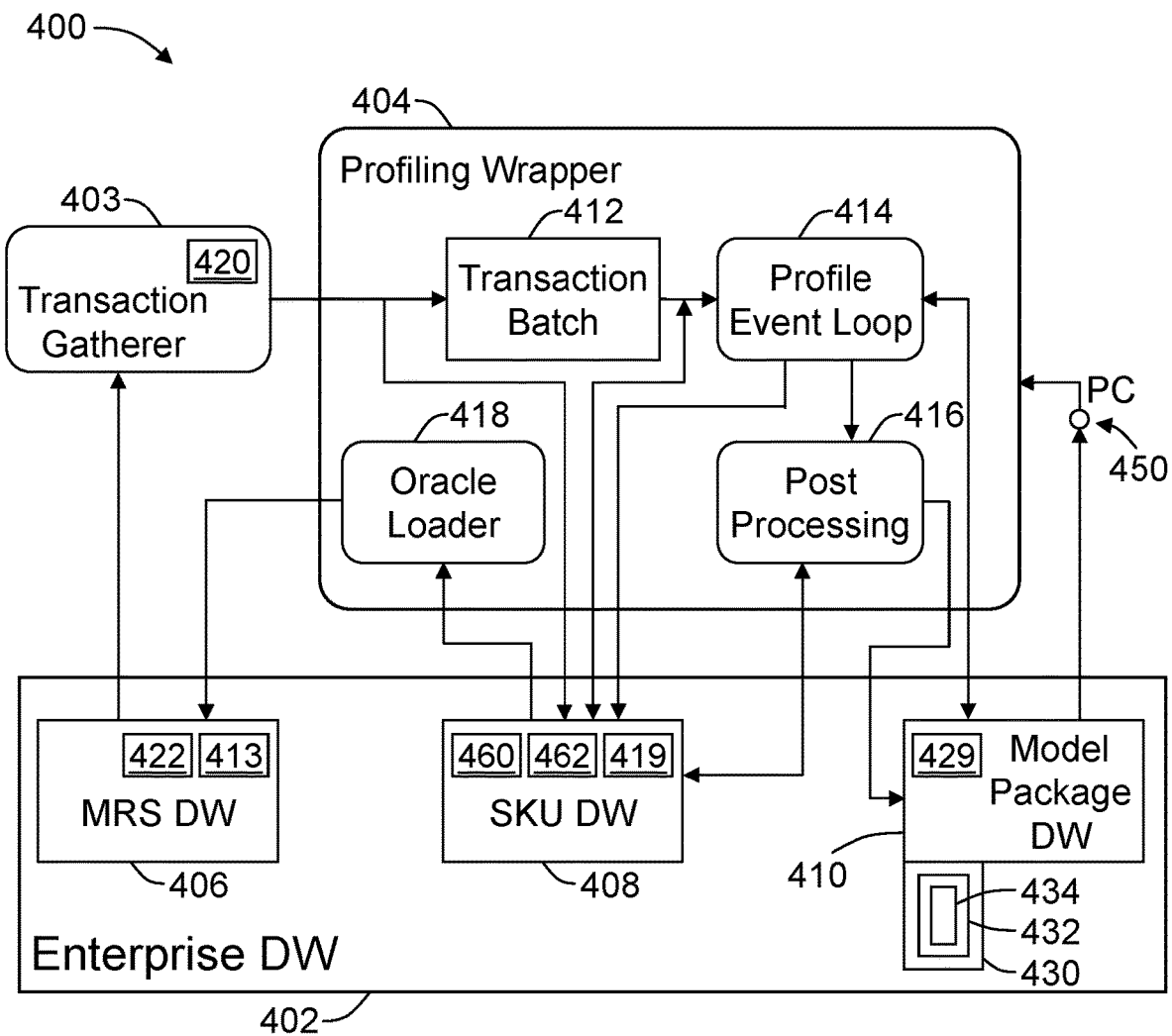
FIG. 6 is a schematic block diagram of an exemplary Loyalty Profile Engine (LPE) for determining SKU-level transaction based loyalty profiles for payment cardholders using transaction data of the cardholder.

FIG. 6 is a schematic block diagram of an exemplary Loyalty Profile Engine (LPE) 400 for determining SKU-level transaction based loyalty profiles for payment cardholders using transaction data of the cardholder. LPE 400 includes an Enterprise Data Warehouse (EDW) 402, a Transaction Gatherer (TG) 403, and a Profiling Wrapper 404. EDW 402 includes information related to a cardholder and various activities associated with the cardholder. Loyalty Profile Engine 400 accesses Enterprise DW information and retrieves, for example, the most current retail transactions, redemptions, customer information, and existing profiles of cardholders.

LPE 400 maintains account holder profiles, primarily according to various transactions that may come through the MasterCard® Rewards System (MRS), such as retail transactions, enrollments, and store visits (trips), analyzing this information to support marketing efforts by identifying patterns of account holders' behavior.

EDW 402 includes a MasterCard® Rewards System (MRS) Data Warehouse (DW) 406 for storing cardholder information, an SKU Data Warehouse (DW) 408 for storing purchase, trip, returns, and redemption data for each transaction, and a Model Package Data Warehouse (DW) 410 for storing model data.

MRS DW 406 is a repository of tables that accumulates all MRS activities. In one embodiment, MRS DW 406 includes text files that contain SKU-level transaction information and a collection of MRS data tables 413 containing data recorded via the various transactions types mentioned herein and is communicatively coupled to TG 403, which collects data from MRS DW 406.

TG 403 is a process executed using SAS code (SAS, also known as Statistical Analysis System, is an integrated system of software products provided by SAS Institute.) and interacts with data from MRS DW 406 including for example, transaction details and customer account data, as well as with data external to MRS DW 406 such as upper and lower product hierarchies to produce a staging table. Pre-processing of, for example, the SKU-level transaction data provided by a merchant partner is handled by MRS DW 406. This raw transaction data is formatted into records by MRS DW 406 and these are inserted into a Transaction Detail table 422.

In one embodiment, TG 403 retrieves data directly from MRS DW 406 and MRS data tables 413. In another embodiment, TG 403 retrieves data indirectly from MRS DW 406 and MRS data tables 413.

Summarizing the above, a data preparation module 420 within TG 403 extracts a period of transaction data from Transaction Detail table 422 in MRS DW 406 and prepares it for processing by Profile Event Loop 414.

SKU DW 408 includes input and output tables that receive transactions and permit sorting the transactions into different groupings. A plurality of cardholders' information is collected in Transaction Batch 412 and the information is stored in SKU DW 408. SKU DW 408 includes two sets of profiles, one for accounts and one for customers, contained in separate SAS data sets as well as product hierarchy tables and processed transactions.

As used herein, Model Package DW 410 contains one or more model packages 430 including a collection of models 432, each of which model 432 is a set of SAS code segments 434. Code segments 434 define one or more variables associated with the respective model 432, specify how to initialize the variables upon the creation of a new profile, specify how to update the variables as transactions occur, dictate how to use the variables in scoring each profile, including any "push" application logic, and prescribe how to generate post-update reports/actions if needed.

Model Package DW 410 supplies Profiling Wrapper 404 with a profiling wrapper parameter file 429 to configure Profile Event Loop 414. Model Package DW 410 is the primary user interface for SKU LPE 400.

Model Package DW 410 contains the library of model packages 430 available for generating and updating profile variables and/or scoring profiles. Each model package uses a specific set of transaction types, some transaction types are used by multiple packages and it is possible for a model package to operate on more than one transaction type. Other transaction types may be added.

Each active model package 430 controls how specific profile variables are initiated and updated, even when no transaction is present. For example, a trip model package may specify that the total trips counter is to be modified with each visit to a store. After all the transactions for each customer or account have been processed, customer profiles data set 462 or account profiles data set 419, respectively is output to the corresponding customer-level or account-level SAS data set.

Model Package DW 410 includes various models including, but not limited to: (1) A Retail Model package uses fields from TG 403 related to the retail activity of an account. From these fields, the retail model updates SKU DW variables that synopsize the retail behavior of the account. (2) A Redemption Model package uses fields from TG 403 related to the redemption activity of a customer. From these fields the redemption model updates SKU DW variables that synopsize the redemption behavior of the account. (3) A Departmental Model package uses fields from TG 403 related to the SKU-level retail activity of an account. From these fields it updates SKU DW variables that synopsize this behavior. The activity covered by the department model includes only those calls initiated by the customer. (4) A Spend Breadth model package uses fields from TG 403 related to retail transactions. From these fields it updates SKU DW variables that capture monthly spend breadth information. The breadth may be breadth at the department, class, group, or any level in that merchant's product hierarchy. In the exemplary embodiment, the department level is used however, the Spend Breadth model package is able to use different variables for different merchant-partners.

SKU Clusters are a method of partitioning accounts so that customers with like in-store spending behavior are grouped together. At any one time, every customer belongs to one and only one cluster. This cluster assignment is based on the recency and frequencies of in-store spend in the various departments and consequently will change over time. In the exemplary embodiment, the cluster assignment is reevaluated monthly.

A cluster assignment can be thought of as shorthand for a customer's profile. Summarizing an entire profile into one number inevitably results in a loss of detail but the result is far wieldier. Clusters can be used to evaluate early month on book behavior, customer engagement, and list selection for campaigns, among other things.

Clusters are not a rule-based segmentation scheme. Rather, a similarity-based cluster assignment process is used. A customer's profile is mapped to a vector in a high dimensional Euclidean space, (in this instance, 72 dimensional), and then the distance from that vector to each cluster centroid is computed. The cluster assignment is simply the number of the nearest cluster. The SKU Cluster processing is controlled by a flag in the shell script of Profiling Wrapper 404.

As an example, the values of the variables that measure Christmas card purchasing activity will inflate in the November/December time period for nearly all cardholders. If the cluster assigning code, merely put the raw values of those variables as its input, all cardholder profiles would move towards Christmas card gift buying clusters. To avoid that, the raw scores are ranked into centiles so that a cardholder's score increases only if the cardholder buys more Christmas cards than most other cardholders. Known loyalty profile engines do not include clusters in a post-processing of data that monitors a cardholders spend behavior in a subgroup of a merchant or other business entity. The code that generates the SKU clusters resides in Model Package DW 410 and is applied during post processing.

In the exemplary embodiment, the SKU clustering process includes three steps: ranking the transaction velocity variables into centiles, computing the principal components of the ranked velocity variables, and scoring these transformed profiles with a self-organizing-map technique.

Step 1: Centile Ranking

The centile rankings mitigate the effects of seasonality by replacing a raw recency-frequency score with a relative ranking among all peers. For example, spend in a "Christmas" department is certain to increase in December. Rather than have a large migration of customers to the "Christmas-centric" clusters every December, only those who spend more than their peers in that department will be assigned such a cluster.

The centilization process ranks the customers by each value of several activity variables and divides the resulting list into 100 evenly populated groups of decreasing value ranges.

Step 2: Principal Components Computation

Principal Components Transformation is a standard statistical technique that applies to multi-dimensional random variables. Mathematically, it is a change of the basis that gives an orthonormal set of vectors that maximize the amount of variance captured as each vector is included. It is employed here because it results in more stable clusters that group behavior in a more intuitive way. Not all of the centiled variables are input as some are less reflective of customer behavior than others.

Step 3: Cluster Scoring

In the exemplary embodiment, self-organizing-map includes 4 rows and 6 columns resulting in 24 clusters. The input data is standardized and a batch SOM technique is applied.

A Departmental Breadth model package measures monthly spend breadth at the customer level in each subdivision of a business entity, such as, a merchant or merchant partner. The Departmental Breadth model package uses fields from TG 403 related to retail transactions. From these fields it updates SKU Profile DW variables that capture monthly spend breadth information. Depending on what best suits the business needs for a particular merchant partner, this may be breadth at the department, class, group, or any level in that merchant's product hierarchy. In the exemplary embodiment, the department level is used but the Departmental Breadth model package is capable of using different variables for different merchant-partners. The Departmental Breadth model package itself is located in Model Package DW 410.

The departmental breadth can be reported using Post Processing 416 to illustrate the range of departments that a cardholder has made purchases from with their payment card. If the departmental breadth for a cardholder is high that means that the cardholder has used their payment card at a variety of subdivisions or departments within the business entity. A cardholder with a high departmental breadth is sometimes referred to as a cardholder having a payment card that is a "top of the wallet" payment card. Top of the wallet payment card indicates that the payment card is the one most commonly used by the cardholder. If the trend of the departmental breadth is decreasing, the issuer may be concerned that the cardholder is using other payment cards more frequently and moving away or leaving the issuer's program.

A Retail model package uses fields from TG 403 related to the SKU-level retail activity of an account. From these fields it updates SKU Profile DW variables that synopsize this behavior. SKU LPE 400 accepts SKU-level data from multiple merchant partners. In the exemplary embodiment, the department is the level from the product hierarchy that best suits the business needs. However, for future partners the appropriate level may be different. The Retail model package itself is located in Model Package DW 410.

In the exemplary embodiment, input variables to the Retail model package includes a "department" variable from TG 403 that describes the level of the transaction within the merchant for example, the transaction from any merchant may bring broken down by department, class, or group, etc depending on the merchant goals. Another input variable is "qty" received from TG 403 that describes a number of items purchased by SKU-level. A "total_price" variable is received from TG 403 and describes the total price for the transaction at the SKU-level. A "sku_txn_date" variable is received from TG 403 and describes the date of the transaction. A "sku_txn_type" variable is derived I TG 403 and describes the transaction's applicability. A "data_window_end" variable is received from TG 403 and is a SAS macro variable indicating the end of the time period being processed.

The output variables of the form DPT_dptxy, where x is in {Y, H, Q}, y is in {V, A} are 'velocity' variables whose value decays exponentially over a period of time.

The output variables are exponential decay functions and so converge to 0 in the absences of activity. The rate of convergence is defined by the Y, H, or Q. For example, a variable like "the number of items purchased in the past 60 days" would be updated using the following formula, $$x \leftarrow xe^{-k\delta} + y, \text{ where}$$

k is an aging constant,

δ is the number of days since the last transaction, and y is DPT_dptxyi if the current transaction satisfies DPT_dptxyq or 0 otherwise.

A spend ratio can be reported using Post Processing 416 to illustrate the spending habits of a cardholder over time. A cardholder's typical spend level is determined by LPE 400 based on the history of spending by that cardholder. When that cardholder's spending increases, a graph in the report shows a line moving upward showing the cardholder's current spending habits in relation to their average spending level. If the spending ratio decreases and drops below the average spending level, an issuer may be concerned that the cardholder is moving away from the issuer's program.

A Profiler Control (PC) Interface 450 is the interface through which the SKU LPE system behavior is configured. In one embodiment, PC Interface 450 comprises one or more text files. A set of configuration parameters is used as PC) Interface 450 for executing the set of models. The configuration parameters include pathnames for the profile, account, and model data warehouses, a list of the active model packages, settings for debugging, training, testing, validation, and production, filenames for support macros and tables, a flag indicating whether all profiles should be brought up to date on a given run, or only those for which there is a transaction, and a collection of support tables and/or macros.

TG 403 collects current transaction activity associated with a cardholder from MRS DW 406. TG 403 monitors MRS data tables 413 for retail transactions accumulated since the previous run, and populates a table within Transaction Batch 412 accordingly.

TG 403 has two primary responsibilities:
  collecting SKU transaction data from merchant partners and the product hierarchy information for the transactions in the transaction data, and
  preparing the collected data for further processing so that it is in the form required for processing by Transaction Batch 412 and Profile Event Loop 414.

In the exemplary embodiment, raw text files including the transaction information are converted to SAS datasets including transactions suitable for processing by Profile Event Loop 414. In one embodiment, product hierarchy files are converted to SAS datasets that will be available for ad hoc uses. In various other embodiments, there may be a need, for future merchant partners that have different data on their SKU transactions, to require significant interaction with their respective product hierarchies.

During operation, TG 403 begins processing after notification that MRS has received raw transaction and possibly product hierarchy files and has placed copies of them in a predetermined directory.

TG 403 copies the raw files from the predetermined directory to a working directory where an SAS job is executed using the files in the working directory. Each job is identified by a system parameter corresponding to the date the files to be processed were received. For example, if the files were received on 8 Jul. 2009, then the SAS job will have that date embedded in the file name. Whenever TG 403 extracts a given transaction type, it looks for all the relevant activity that occurred at or after a designated beginning time, and before a designated ending time. This extraction window is designed to ensure that TG 403 captures every event exactly once, with nothing missed and nothing duplicated.

The SAS job processes all files of this form into a SAS dataset, creates the required transaction types for processing by Profile Event Loop 414, and uses an Oracle table CUSTOMER_ACCOUNT to merge customer_id and account_id. Lastly, it calculates the date range spanned by the transactions it contains. The resulting dataset is named using a predetermined convention including an identification of the data, the dates the data begins and ends, and the date of processing. When all of the transactions for a period, for example, a month, have been processed into SAS datasets, sort program sorts the files created and outputs files whose transactions coincide with the period, for example, a calendar month. They are named per convention. When product hierarchy files are received, the hierarchy files are read also. In addition to converting the raw files into SAS datasets, TG 403 builds formats used in post process reporting and so should be run whenever new product hierarchy data is received.

In one embodiment, TG 403 prepares the raw SKU transactions and product hierarchies (such as class and department) from merchant partners for generation and updating of customer profiles.

The data preparation step of TG 403 accepts from profiling wrapper 404 the constraints specifying the MRS data to extract. These parameters may include date range, bin range, hash range, and product code, to name a few. TG 403 monitors MRS data tables 413 for the in-store activity that has occurred since the previous run. That activity is then converted into transactions, which is defined much more broadly than just SKU-level purchase transactions, and may also include trip data, participation in a promotion, and qualifying for a promotion to name a few. Another function of TG 403 is to append the appropriate internal MRS customer and account keys for use by Profile Event Loop 414 and to deal with the issue of replacement or reissued cards.

TG 403 processes the SKU transaction details and customer account data using the upper and lower product hierarchy tables to produce a staging table. The raw transaction data is made available to SKU LPE. Consequently, TG 403 processes these product hierarchy files. Input variables provided to TG 403 includes a plurality of division, department, class, subclass, style, and description from a product master source as well as a SKU, style, color reference, color description, size reference, size description, season reference, and a season description from a SKU table. Some of these variables have been mentioned previously. Output variables provided by TG 403 include an account identifier, an account number (the card number), a store number (merchant's location code), a SKU transaction date, a SKU (lowest product hierarchy), a department (level 2 of product hierarchy), a quantity (a number of items for the particular SKU) and a transaction amount (total paid for the SKU) provided from Transaction Detail table 422 as well as a customer identifier from a CUSTOMER_ACCOUNT table. A SKU transaction type is derived by TG 403 and is a code describing an applicability of a transaction.

The variables stored in customer profiles data set 462 and account profiles data set 419 are determined by the model set used. For example, a trip model might track the ten most recent store locations and the corresponding dates. There are also overhead variables such as, but not limited to, "profile creation date" and "last seen date". Each model package 430 in Model Package DW 410 maintains a portion of the variables housed in the SKU Profile DW 460.

Model Package DW 410 contains the library of Model Packages 430 available for generating and updating profile variables and/or scoring profiles. Each model package uses a specific set of transaction types, some transaction types are used by multiple packages and it is possible for a model package to operate on more than one transaction type.

Once TG 403 has collected all current activity on the cardholder, TG 403 passes the information to Transaction Batch 412. A plurality of cardholders' information is collected in Transaction Batch 412 and the information is stored in SKU DW 408 and transmitted to Profile Event Loop 414. More specifically, Transaction Batch 412 extracts and transforms transaction data so that it is ready for input to Profile Event Loop 414.

TG 403 also processes raw product hierarchy files on a less frequent basis. The Profile Event Loop 414 provides logic for merging profile information from SKU Profile DW 460 with transaction data and applies the active model packages (from Model Package DW 410) to update and score profiles before returning them to SKU Profile DW 460. A Profiling Wrapper is a scheduled job that orchestrates the calls to TG 403 and the Profile Event Loop 414. Model Package DW 410 supplies the runtime parameters for the profiling wrapper.

SKU Profiling Wrapper 404 includes Transaction Batch 412, Profile Event Loop 414, a module for Post Processing 416, and an Oracle Loader 418. SKU Profiling Wrapper 404 comprises logic that controls SKU LPE 400 after TG 403 has prepared a batch of transactions. In one embodiment, SKU Profiling Wrapper 404 comprises a shell script as well as text files containing parameters that control, for example, the aging of inactive profiles, cluster scoring, the date range of the transaction extract, information on the active model files, the locations of the various data warehouses needed, and post-process reporting.

SKU Profiling Wrapper 404 process retrieves parameters via the text files and places the parameter values into Unix environment variables that are available to any process administered by SKU Profiling Wrapper 404.

SKU Profiling Wrapper 404 has three responsibilities:
parsing the SKU LPE run parameters,
deploying Unix file links that simplify SKU LPE execution, and
controlling the execution of the various SAS programs that produce profiles, score clusters, produce post-processing reports, and, in the future, load Oracle tables with profiles.

Some of the environment variables are parsed out of the contents of the text files containing parameters, which contain a string such as:
prod_20090630_1_1_0, wherein
"prod" indicates to Profile Event Loop 414 which code to include for reading parameters (prod.sas).

"20090630" is the end of the data window, the first binary indicator (in this case '1') indicates that all aging variables are forced to update even without a transaction, the second binary indicator (in this case '1') indicates that clusters are to be scored and post-process standard reports will be run after Profile Event Loop 414 completes, and the third binary indicator (in this case '0') determines whether the SAS profile data sets are copied into corresponding Oracle tables.

Other environment variables are hard-coded and correspond to the physical location of SKU LPE 400.

Profiling Wrapper 404 determines the cardholder profile and outputs a concise, up-to-date view of the cardholder, card usage patterns, and current state of the account.

Profiling Wrapper 404 simplifies the execution of the SKU LPE by deploying symbolic file links in Unix. The set of transactions being processed should have the data window end date embedded in its name and should be the only transaction SAS dataset with that date. A link to that file is created allowing Profile Event Loop 414 to process the transactions intended. This link is generated before Profile Event Loop 414 is invoked. After the conclusion of Profile Event Loop 414, two more symbolic links are created. The link to the account (or customer) profiles just written. This allows Profile Event Loop 414 to read the appropriate profiles on the next SKU LPE run. Controlling the execution of Profile Event Loop 414, the cluster scoring and post-process reporting, and writing output to Oracle tables in MRS DW 406 is also handled by profiling wrapper 404 by the environment variables received from the contents of the text files containing parameters.

Transaction Batch 412 comprises a data set of extracted and transformed transaction data, ready for input to Profile Event Loop 414.

Once TG 403 has collected all current activity on the cardholder, TG 403 passes the information to Transaction Batch 412. A plurality of cardholders' information is collected in Transaction Batch 412 and the information is stored in SKU DW 408 and transmitted to Profile Event Loop 414.

SKU Loyalty Profile Event Loop 414 takes as input the current batch of transactions from TG 403, as well as the profiles from SKU DW 408. There are two sets of profiles, one for accounts and one for customers, contained in separate SAS data sets. Profile Event Loop 414 processes the transactions in order of MRS transaction date, modifying the profiles as it proceeds. Profile Event Loop 414 retrieves parameters from environment variables as defined by Profiling Wrapper 404.

Each active model package controls how specific profile variables are initiated and updated, even when no transaction is present. For example, a redemption model package may specify that the total points redeemed be modified with each redemption, a trip model package may specify that the total trips counter is to be modified with each visit to a store, or a Retail Model package may specify that the a certain subdivision spend velocity variable be modified with every profile update. After all the transactions for each customer or account have been processed, the customer or account profile is output to the corresponding customer- or account-level SAS data set.

Profile Event Loop 414 merges data from Transaction Batch 412, SKU DW 408 by the internal MRS customer, and account keys. Profile Event Loop 414 also contains the logic for applying the active models as the transactions are being processed. The output of Profile Event Loop 414 is an updated collection of profiles. More specifically, Profile Event Loop 414 determines the current state of the account using input from Transaction Batch 412 and Model Package DW 410. After determining the loyalty profile for the transaction cardholder, Profile Event Loop 414 updates the profile for the cardholder at Model Package DW 410. In one embodiment, the Profile Event Loop 414 is a Loyalty Profile Engine (LPE) event loop which is the handler of all in-store retail transactions, and related data, from merchant partners. LPE utilizes those transactions along with available model packages to keep a set of profiles both at the customer and account level.

Table 1 is a pseudo-code example of a profile event loop algorithm.

TABLE 1

```
Merge the existing profiles and transactions by customer_id and account_id
    So, now a copy of each customer (or account) profile is paired
    up with any incoming customer (or account) transaction
Declare any variables needed for calculations to follow
Retain the customer- (or account-) level variables corresponding variable values
across records.
Do the following for all records that qualify (usually all records e.g., one could select
specific programs, etc.)
    if first.customer_id or first.account_id then
        if current record is a transaction for a new profile then
            if first.customer_id then
                Brand new customer -- initialize customer and account
variables
            end
            else if first.account_id then
                This is a new account for an existing customer.
                Just initialize account variables.
            end
        end
    end
    if not first.customer_id then
        Carry down the customer level fields from the previous observation,
        unless it's a new customer
    end
    if the current record contains a merged in transaction then
        Execute the model package logic where a transaction is required.
        Execute the model package logic where a transaction is optional, e.g.,
aging variables
```

TABLE 1-continued

```
        Execute the model package logic for scoring profiles.
    end;
    else if we want to force some model package to update even when no
transaction is present then
        Execute the model package logic where a transaction is optional, e.g.,
aging variables
        Execute the model package logic for scoring profiles.
    end
    Copy the customer-level variables to a temporary place in case we need that
    as
        we cross account boundaries
    /* Output the appropriate rows to the correct data sets */
    if last.account_id and account_id ne 0 then
        Output the account-level variables to the account profile data set
    if last.customer_id then
        Set the account_id to 0's (to indicate that it is a customer-level
record)
        Output the customer-level variables to the customer profile data set
    end
end of list of qualifying records in sample
```

Post Processing module 416 defines the process for cluster scoring and SKU LPE post-process reporting. Clustering of a cobrand merchant partners' customers is based on the spend behavior at the cobrand merchant. These clusters assignments are monitored and analyzed using a suite of cluster based reports. SKU LPE 400 can accommodate one cobrand merchant or is easily expanded for multiple cobrand merchant partners. The cluster scoring process is contained in a SAS program that houses the various other SAS jobs that do the actual scoring. The cluster scoring and post process reporting code is called inside the script of Profiling Wrapper 404.

A job, "determine_centiles" scores the clusters based on monthly rankings (grouped into centiles) of various department velocity variables. This job determines the cutoffs for those centiles.

A job "create_format" processes the centile cutoffs into monthly SAS formats places them into the SKU LPE format library. A job, "apply formats" reads the newly computed account profiles and the variables of the appropriate velocity variables are formatted into the centiles. A job, "score" computes the actual cluster assignments and writes the computed cluster assignments to permanent SAS datasets.

The post-process reports are organized similarly using an SAS program that calls the various reporting SAS jobs. The reports are generated using SKU transactions and cluster assignments and provide a view of overall cobrand card spend by cluster as well as a breakdown of industry spend by cluster. The reports are based on a rolling 12 months of profiles and transaction details from the LPE. A series of reports, for example, EXCEL® spreadsheets are generated and automatically delivered, for example, via e-mail, to the business owner.

Oracle Loader 418 retrieves the SAS data sets and copies them to Oracle tables so that other applications can read from the data sets.

Using the above described embodiments to generate profiles, or customer-level summaries capturing a "profile" of a transaction card's state allows an entity to obtain a rich summary of spending behavior at a merchant partner. Such spend behavior can span store departments or even SKU-level behavior. The Profile Event Loop 414 component populates SKU Profile DW 460 in EDW 402.

One data feed includes SKU-level transactions for modifying profile states which allows for the recognition of richer spend behavior patterns contained in the profiles. TG 403 monitors MRS data tables 413 for retail transactions accumulated since the previous run, and populates a table within Transaction Batch 412 accordingly. Another data feed is the utilization of the merchant partners product master to enhance the POS transaction records, which allows for analysis at levels of the product hierarchy that may not be carried on the POS transaction record. TG 403 monitors MRS data tables 413 for updated product masters and incorporates this data into the transaction before it is process by the SKU LPE 400.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer system for predicting future cardholder behavior, said computer system comprising at least one processor communicatively coupled to a memory and a data warehouse, the memory comprising instructions, wherein when executed by the at least one processor, the instructions cause the at least one processor to:

execute a shell script;

control, by the shell script, execution of a transaction gatherer (TG) statistical code package, including passing constraints specifying data for extraction to the TG statistical code package, causing the TG statistical code package to:

retrieve, from the data warehouse, (i) raw transaction data from a plurality of transactions between a plurality of cardholders and a merchant, wherein the raw transaction data for each of the transactions includes a transaction date, an account identifier of a corresponding one of the cardholders, and at least one SKU associated with the transaction, and (ii) SKU-level hierarchy data for the merchant, wherein the SKU-level hierarchy data associates each of a plurality of SKUs with at least one of a plurality of classifications within the merchant;

create, in the data warehouse from the retrieved raw transaction data and the retrieved SKU-level hierarchy data, a staging table comprising a plurality of records, each of the records including the account identifier, the transaction date, the at least one SKU, the at least one classification associated with the SKU, and a transaction amount; and extract a transaction batch from the staging table in the data warehouse, the transaction batch including records having the transaction date within a selected time period;

deploy, by the shell script, a first symbolic file link to the extracted transaction batch;

invoke, by the shell script, a profile event loop;

retrieve, by the profile event loop from the data warehouse, a selected one of a plurality of models, wherein each of the models comprises a set of code segments defining a corresponding set of profile variables, instructions for initiating the corresponding set of profile variables and instructions for updating of the corresponding set of profile variables in response to transactions, wherein the corresponding set of profile variables includes at least one transaction velocity variable for each of the plurality of classifications;

apply, by the profile event loop, the retrieved set of code segments for the selected model to the records in the extracted transaction batch, identified by the first symbolic file link, that include the respective account identifier to generate a plurality of account profiles for the selected model, each of the account profiles associated with a respective one of the account identifiers, each of the account profiles comprising values for the corresponding set of profile variables;

subsequent to generating the plurality of account profiles, execute, by the shell script, a post-processing statistical code package configured to:
normalize the at least one transaction velocity variable by ranking the values of the at least one transaction velocity variable from the plurality of account profiles, dividing the ranking into evenly populated groups of decreasing value ranges, and associating the one of the groups for each account profile with the account profile; and
derive clusters of the account profiles by:
mapping a subset of the values of each account profile to a corresponding vector, wherein the subset of the values includes the normalized at least one transaction velocity variable,
applying a principal components transformation to determine a center of each cluster in a resulting vector space; and
assigning each account profile to the cluster having the center nearest to the corresponding vector; and
predict a future behavior of at least one cardholder with respect to one or more of the plurality of classifications based on the cluster assignment of the corresponding account profile.

2. The computer system according to claim 1, wherein when executed by the at least one processor, the instructions further cause the at least one processor to transmit to the merchant a report including overall spend by the plurality of cardholders in each of the plurality of clusters.

3. The computer system according to claim 1, wherein when executed by the at least one processor, the instructions further cause the at least one processor to transmit, to at least one cardholder, an incentive selected to counteract a predicted decrease in future usage of the corresponding account identifier with respect to one or more of the plurality of classifications based on the cluster assignment of the corresponding account profile.

4. The computer system according to claim 1, wherein when executed by the at least one processor, the instructions further cause the at least one processor to generate the plurality of account profiles for the selected model by:
determining, for a first account identifier, that no corresponding first account profile is stored in the data warehouse;
executing the code segments of the set of code segments that define the initiation of the corresponding set of profile variables to generate initial values of the corresponding set of profile values; and
applying, to the initial values and the records in the transaction batch that include the first account identifier, the code segments of the set of code segments that define the updating of the corresponding set of profile variables to generate the values for the first account profile corresponding to the first account identifier.

5. The computer system according to claim 4, wherein when executed by the at least one processor, the instructions further cause the at least one processor to generate the plurality of account profiles for the selected model by:
determining, for a second account identifier, that a corresponding second account profile is already stored in the data warehouse;
extracting, from the data warehouse, the values of the set of profile variables from the already stored second account profile; and
applying, to the extracted values and the records in the transaction batch that include the second account identifier, the code segments of the set of code segments that define the updating of the corresponding set of profile variables to generate the values for the second account profile corresponding to the second account identifier.

6. The computer system according to claim 1, wherein the records include transactions of a plurality of types, wherein the plurality of types include reward redemption transactions, and wherein the set of code segments for the selected model define the at least one transaction velocity variable based on records for transactions of solely the reward redemption type.

7. The computer system according to claim 1, wherein the at least one classification associated with the SKU includes at least one of a style classification, a color classification, a size classification, and a season classification.

8. A method for predicting future cardholder behavior, said method implemented on a computer system including at least one processor communicatively coupled to a memory and a data warehouse, the method comprising:
executing a shell script;
controlling, by the shell script, execution of a transaction gatherer (TG) statistical code package, including passing constraints specifying data for extraction to the TG statistical code package, causing the TG statistical code package to execute steps including:
retrieving, by the at least one processor from the data warehouse, (i) raw transaction data from a plurality of transactions between a plurality of cardholders and a merchant, wherein the raw transaction data for each of the transactions includes a transaction date, an account identifier of a corresponding one of the cardholders, and at least one SKU associated with the transaction, and (ii) SKU-level hierarchy data for the merchant, wherein the SKU-level hierarchy data associates each of a plurality of SKUs with at least one of a plurality of classifications within the merchant;

creating, by the at least one processor in the data warehouse from the retrieved raw transaction data and the retrieved SKU-level hierarchy data, a staging table comprising a plurality of records, each of the records including the account identifier, the transaction date, the at least one SKU, the at least one classification associated with the SKU, and a transaction amount;

extracting, by the at least one processor, a transaction batch from the staging table in the data warehouse, the transaction batch including records having the transaction date within a selected time period;

deploying, by the shell script, a first symbolic file link to the extracted transaction batch;

invoking, by the shell script, a profile event loop;

retrieving, by the profile event loop from the data warehouse, a selected one of a plurality of models, wherein each of the models comprises a set of code segments defining a corresponding set of profile variables, instructions for initiating the corresponding set of profile variables and instructions for updating of the corresponding set of profile variables in response to transactions, wherein the corresponding set of profile variables includes at least one transaction velocity variable for each of the plurality of classifications;

applying, by the profile event loop, the retrieved set of code segments for the selected model to the records in the extracted transaction batch, identified by the first symbolic file link, that include the respective account identifier to generate a plurality of account profiles for the selected model, each of the account profiles associated with a respective one of the account identifiers, each of the account profiles comprising values for the corresponding set of profile variables;

subsequent to generating the plurality of account profiles, executing, by the shell script, a post-processing statistical code package configured to:

normalize, by the at least one processor, the at least one transaction velocity variable by ranking the values of the at least one transaction velocity variable from the plurality of account profiles, dividing the ranking into evenly populated groups of decreasing value ranges, and associating the one of the groups for each account profile with the account profile; and derive, by the at least one processor, clusters of the account profiles by:

mapping a subset of the values of each account profile to a corresponding vector, wherein the subset of the values includes the normalized at least one transaction velocity variable, applying a principal components transformation to determine a center of each cluster in a resulting vector space; and assigning each account profile to the cluster having the center nearest to the corresponding vector; and predicting, by the at least one processor, a future behavior of at least one cardholder with respect to one or more of the plurality of classifications based on the cluster assignment of the corresponding account profile.

9. The method according to claim 8, further comprising transmitting, by the at least one processor to the merchant, a report including overall spend by the plurality of cardholders in each of the plurality of clusters.

10. The method according to claim 8, further comprising transmitting, by the at least one processor to at least one cardholder, an incentive selected to counteract a predicted decrease in future usage of the corresponding account identifier with respect to one or more of the plurality of classifications based on the cluster assignment of the corresponding account profile.

11. The method according to claim 8, wherein generating the plurality of account profiles for the selected model comprises:

determining, by the at least one processor for a first account identifier, that no corresponding first account profile is stored in the data warehouse;

executing, by the at least one processor, the code segments of the set of code segments that define the initiation of the corresponding set of profile variables to generate initial values of the corresponding set of profile values; and applying, by the at least one processor to the initial values and the records in the transaction batch that include the first account identifier, the code segments of the set of code segments that define the updating of the corresponding set of profile variables to generate the values for the first account profile corresponding to the first account identifier.

12. The method according to claim 11, wherein generating the plurality of account profiles for the selected model further comprises:

determining, by the at least one processor for a second account identifier, that a corresponding second account profile is already stored in the data warehouse;

extracting, by the at least one processor from the data warehouse, the values of the set of profile variables from the already stored second account profile; and applying, by the at least one processor to the extracted values and the records in the transaction batch that include the second account identifier, the code segments of the set of code segments that define the updating of the corresponding set of profile variables to generate the values for the second account profile corresponding to the second account identifier.

13. The method according to claim 8, wherein the records include transactions of a plurality of types, wherein the plurality of types include reward redemption transactions, and wherein the set of code segments for the selected model define the at least one transaction velocity variable based on records for transactions of solely the reward redemption type.

14. The method according to claim 8, wherein the at least one classification associated with the SKU includes at least one of a style classification, a color classification, a size classification, and a season classification.

15. One or more non-transitory computer readable media including instructions that, when executed by at least one processor communicatively coupled to a memory and a data warehouse, cause the at least one processor to:

execute a shell script;

control, by the shell script, execution of a transaction gatherer (TG) statistical code package, including passing constraints to the TG statistical code package causing the TG statistical code package to:

retrieve, from the data warehouse, (i) raw transaction data from a plurality of transactions between a plurality of cardholders and a merchant, wherein the raw transaction data for each of the transactions includes a transaction date, an account identifier of a corresponding one of the cardholders, and at least one SKU associated with the transaction, and (ii) SKU-level hierarchy data for the merchant, wherein the SKU-level hierarchy data associates each of a plurality of SKUs with at least one of a plurality of classifications within the merchant;

create, in the data warehouse from the retrieved raw transaction data and the retrieved SKU-level hierarchy data, a staging table comprising a plurality of records, each of the records including the account identifier, the transaction date, the at least one SKU, the at least one classification associated with the SKU, and a transaction amount; and extract a transaction batch from the staging table in the data warehouse, the transaction batch including records having the transaction date within a selected time period;

deploy, by the shell script, a first symbolic file link to the extracted transaction batch;

invoke, by the shell script, a profile event loop;

retrieve, by the profile event loop from the data warehouse, a selected one of a plurality of models, wherein each of the models comprises a set of code segments defining a corresponding set of profile variables, instructions for initiating the corresponding set of profile variables and instructions for updating the corresponding set of profile variables in response to transactions, wherein the corresponding set of profile variables includes at least one transaction velocity variable for each of the plurality of classifications;

apply, by the profile event loop, the retrieved set of code segments for the selected model to the records in the extracted transaction batch, identified by the first symbolic file link, that include the respective account identifier to generate a plurality of account profiles for the selected model, each of the account profiles associated with a respective one of the account identifiers, each of the account profiles comprising values for the corresponding set of profile variables;

subsequent to generating the plurality of account profiles, execute, by the shell script, a post-processing statistical code package configured to:

normalize the at least one transaction velocity variable by ranking the values of the at least one transaction velocity variable from the plurality of account profiles, dividing the ranking into evenly populated groups of decreasing value ranges, and associating the one of the groups for each account profile with the account profile; and derive clusters of the account profiles by:

mapping a subset of the values of each account profile to a corresponding vector, wherein the subset of the values includes the normalized at least one transaction velocity variable, applying a principal components transformation to determine a center of each cluster in a resulting vector space; and assigning each account profile to the cluster having the center nearest to the corresponding vector; and predict a future behavior of at least one cardholder with respect to one or more of the plurality of classifications based on the cluster assignment of the corresponding account profile.

16. The one or more non-transitory computer readable media according to claim 15, wherein when executed by the at least one processor, the instructions further cause the at least one processor to transmit to the merchant a report including overall spend by the plurality of cardholders in each of the plurality of clusters.

17. The one or more non-transitory computer readable media according to claim 15, wherein when executed by the at least one processor, the instructions further cause the at least one processor to transmit, to at least one cardholder, an incentive selected to counteract a predicted decrease in future usage of the corresponding account identifier with respect to one or more of the plurality of classifications based on the cluster assignment of the corresponding account profile.

18. The one or more non-transitory computer readable media according to claim 15, wherein when executed by the at least one processor, the instructions further cause the at least one processor to generate the plurality of account profiles for the selected model by:

determining, for a first account identifier, that no corresponding first account profile is stored in the data warehouse;

executing the code segments of the set of code segments that define the initiation of the corresponding set of profile variables to generate initial values of the corresponding set of profile values; and applying, to the initial values and the records in the transaction batch that include the first account identifier, the code segments of the set of code segments that define the updating of the corresponding set of profile variables to generate the values for the first account profile corresponding to the first account identifier.

19. The one or more non-transitory computer readable media according to claim 18, wherein when executed by the at least one processor, the instructions further cause the at least one processor to generate the plurality of account profiles for the selected model by:

determining, for a second account identifier, that a corresponding second account profile is already stored in the data warehouse;

extracting, from the data warehouse, the values of the set of profile variables from the already stored second account profile; and applying, to the extracted values and the records in the transaction batch that include the second account identifier, the code segments of the set of code segments that define the updating of the corresponding set of profile variables to generate the values for the second account profile corresponding to the second account identifier.

20. The one or more non-transitory computer readable media according to claim 15, wherein the records include transactions of a plurality of types, wherein the plurality of types include reward redemption transactions, and wherein the set of code segments for the selected model define the at least one transaction velocity variable based on records for transactions of solely the reward redemption type.

* * * * *